Jan. 19, 1971 G. J. GANLEY 3,555,908
ALTITUDE INDICATOR
Filed March 3, 1969 2 Sheets-Sheet 2

INVENTOR.
GREGORY J. GANLEY
BY Charles J. Ungemach
ATTORNEY

United States Patent Office 3,555,908
Patented Jan. 19, 1971

3,555,908
ALTITUDE INDICATOR

Gregory J. Ganley, Minneapolis, Minn., assignor to Honeywell Inc., Minneapolis, Minn., a corporation of Delaware
Filed Mar. 3, 1969, Ser. No. 803,753
Int. Cl. G01l 7/20
U.S. Cl. 73—384                         5 Claims

ABSTRACT OF THE DISCLOSURE

A servoed altitude indicator with means for correcting the altitude indication as a function of local barometric pressure. The correction factor is generated by a pair of eccentric gears which approximate an equation of the form $$\Delta H = K_1 \left(1 - \frac{P}{K_2}\right) K_3$$

where $K_1$, $K_2$, and $K_3$ are constants, $\Delta H$ is the altitude correction in feet, and P is the local barometric pressure in inches of mercury.

BACKGROUND OF THE INVENTION

The invention pertains to the field of altitude indicators and particularly to indicators wherein the altitude is corrected as a function of the local barometric pressure.

SUMMARY

An aircraft barometric altitude indicator requires a nonlinear correction for local barometric pressure. The equation relating the correction to local pressure is $\Delta H = -145.447(10)^3[1-(P/29.92126)]0.190255$ where $\Delta H$ is the altitude change in feet and P is the local barometric pressure in inches of mercury. This function is approximated with a pair of eccentric gears. The correction factor developed by the gears is combined with the uncorrected altitude signal to give a corrected altitude signal. The correction could be accomplished with a cam and follower, tape cam, or nonlinear gearing, but this invention uses a simpler and more reliable pair of eccentric gears. The gears may be thought of as a non-linear function generator.

DESCRIPTION

Figure 1:
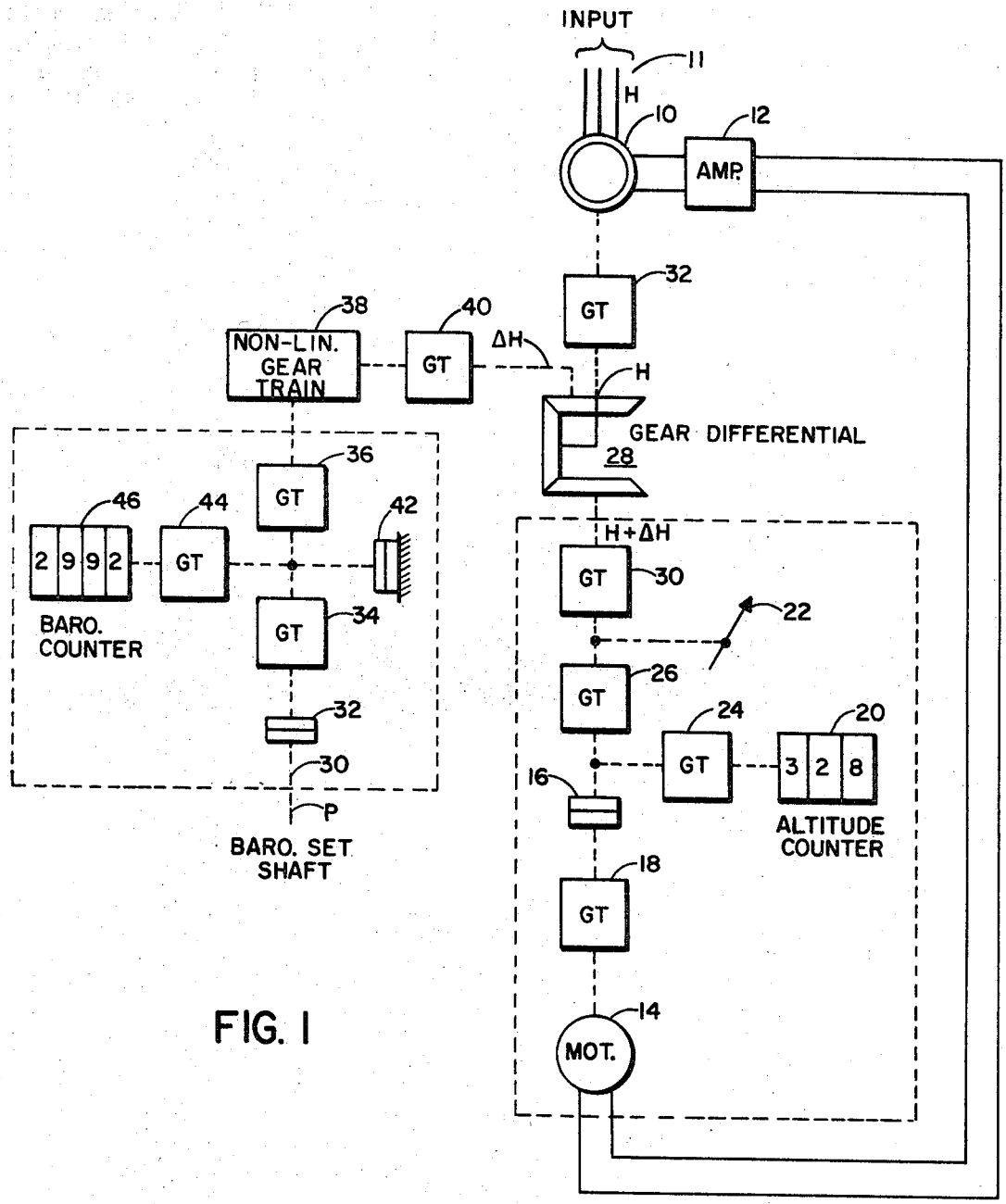
FIG. 1 is a block diagram showing the corrected indicator.

In FIG. 1 an electrical signal indicative of altitude (H) is developed by an air data computer (ADC), not shown, and applied to the stator windings of a synchro 10 by means of three wires or leads 11. Synchro 10, if it is not nulled, develops an electrical output signal across its rotor winding which is increased in power by amplifier 12 and applied to a motor 14. The output shaft of motor 14 is connected to one side of a clutch 16 by means of a gear train 18. The other side of clutch 16 is connected to a pair of meters, an altitude counter 20 and a pointer 22, by means of gear trains 24 and 26, respectively. The output of gear train 26, that is, at pointer 22, is connected to one input side of a gear differential 28 by a gear train 30. The output of differential 28 is connected to the rotor of synchro 10 by a gear train 32. Motor 14 is driven in response to the output of amplifier 12 until the rotor of synchro 10 reaches a null position.

If there was no correction for local barometric pressure, counter 20 and pointer 22 would then indicate the altitude as computed by the ADC, but it would be uncorrected altitude. Synchro 10, amplifier 12, motor 14, differential 28, and the associated gear trains, etc., make up a servoed altitude indicator.

The correction factor for local barometric pressure is introduced at a second input of differential 28. This correction factor is set in by twisting or rotating a baro set shaft 30. Shaft 30 is connected by means of a slip clutch 32, gear train 34, and gear train 36 to the input of a nonlinear element 38. The output of element 38 is connected to the second input of differential 28 by a gear train 40. The junction between gear trains 34 and 36 is connected to a drag clutch 42 and is also connected by means of a gear train 44 to a baro counter 46. Shaft 30 is rotated until counter 46 indicates the proper local barometric pressure. The nonlinear element 38 converts this rotation to the correction factor $\Delta H$ which is applied to the second input of differential 28. The basic servo altitude indicator takes a new position in accordance with the correction factor and is in this way corrected for local barometric pressure.

Clutch 32 slips when stops (not shown) in the system are reached. Clutch 42 is to prevent rotation of counter 46, due, for example, to acceleration and vibration of the system in which the indicator is mounted or reflected load from differential 28.

The nonlinear element 38 could be a cam and follower, a tape cam, or nonlinear gears. This invention employs simple and reliable eccentric gearing to accomplish the $\Delta H$ function.

Figure 2:
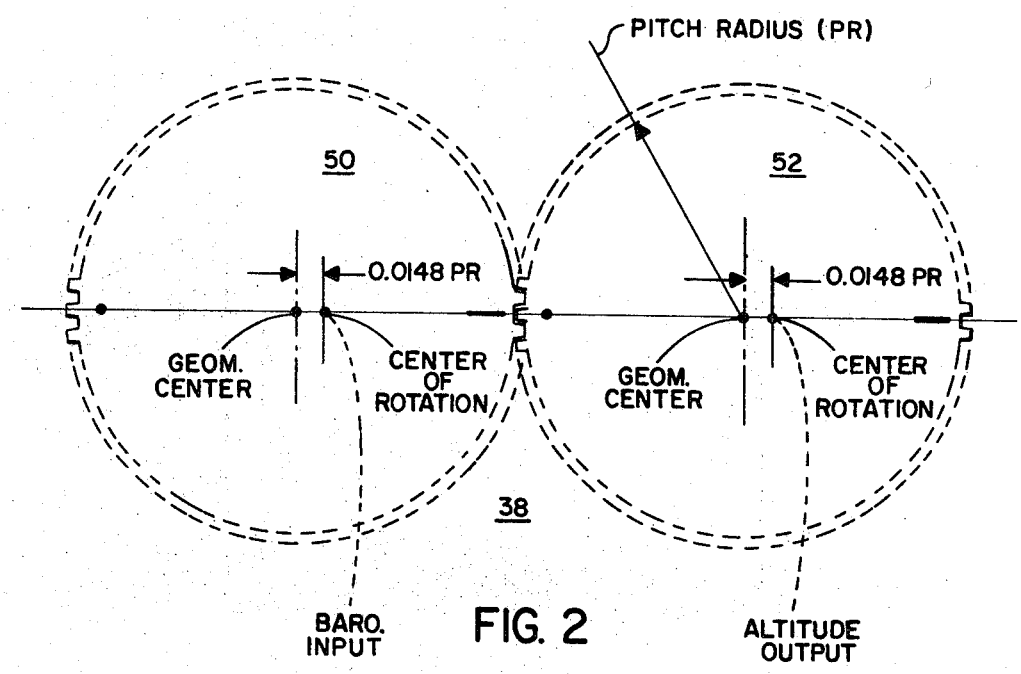
FIG. 2 shows the eccentric gears used to approximate the altitude correction factor.

The eccentric gearing is shown in FIG. 2 and consists of a normal pair of circular gears 50, 52 each having the same number of teeth and diametral pitch. Diametral pitch is the number of gear teeth divided by the pitch circle diameter of the gear. Gears 50, 52 are mounted so that they do not rotate about their geometric centers but about a point which is about 0.0148 times the gear pitch radius from the geometric center. Of course if less accuracy is required a factor in the range 0.01-0.02 may be used instead of the factor 0.0148. Pitch radius (PR) is equal to diametral pitch/2. The factor 0.0148 may also be changed to match the useable rotation of the eccentric gears in other applications. It is necessary for the gear 52 to be mounted as shown in FIG. 2 when gear 50 is as shown. Gear 50 is called the baro input gear and gear 52 is called the altitude output gear.

As the baro input gear 50 is rotated counterclockwise from the position shown, the altitude output gear 52 will rotate clockwise but by a smaller number of degrees than the rotation of the baro input gear 50. When the baro input gear 50 has rotated about 90° the rate of rotation of the two gears will be equal. Beyond 90° the altitude output gear will rotate slightly faster than the baro input gear 50. At 180° both gears will have rotated that same amount. In the process of rotating, the amount of gear tooth engagement will change only slightly. For example, if 81 teeth 120 diametral pitch gears are used the amount of tooth engagement varies only 0.000075 inch.

The eccentricity of the gears can be achieved by mounting each gear on a gear shaft that has an eccentric mounting diameter for the gear. The preferred method of mounting the gears is to mark the gears with a bar and dot code as shown in FIG. 2. Holes are bored at the center of rotation of each gear and the gears are then mounted on a straight shaft. The coded markings are necessary to achieve the correct relationship between the baro input gear 50 and the altitude output gear 52 when they are assembled in a complete system. In other words the coding permits ease of assembly.

Figure 3:
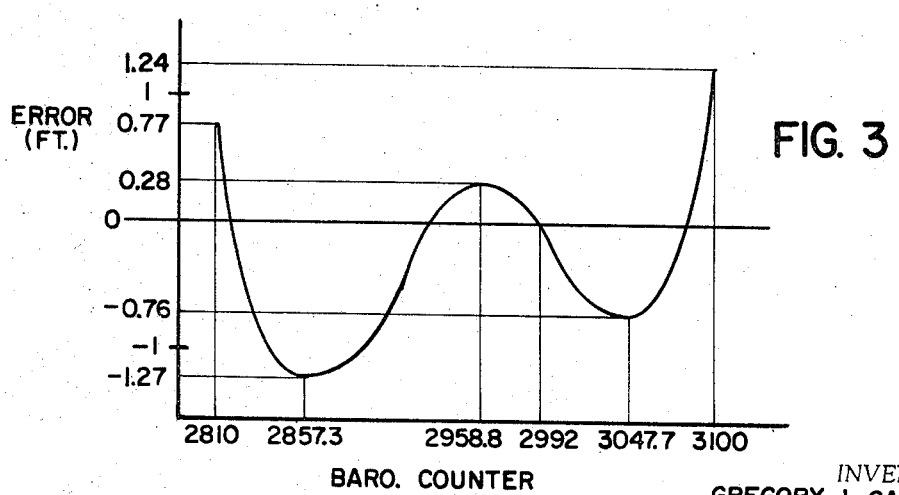
FIG. 3 is a graph showing the error between the actual correction factor and the correction factor as developed by the eccentric gears.

Eccentric gears 50 and 52 approximate the ΔH equation. The deviation, or error, from the theoretical equation is shown in FIG. 3 for the range of interest for a typical servoed altimeter indicator. It is necessary to have zero error at 29.92 inches of mercury (2992 on the baro counter).

What is claimed is:

1. An altitude indicator comprising:
   a synchro having a stator and a rotor and windings thereon, the stator winding having leads for supplying a signal representing the altitude to be indicated;
   an amplifier having input and output means, the input means connected to the rotor winding of the synchro;
   a motor having input and output means, the input means of the motor connected to the output means of the amplifier;
   meter means driven by the output means of the motor;
   a differential means having first and second input means and an output means, the first input means driven by the output means of the motor, and the output means connected to the rotor of the synchro;
   a nonlinear means having input and output means, the input means actuated in accordance with the local barometric pressure, the output means connected to the second input means of the differential means and providing a signal representing a correction to the indicated altitude.

2. The apparatus of claim 1 wherein the nonlinear means comprises a pair of meshing circular gears, each gear mounted for eccentric rotation about a predetermined point.

3. The apparatus of claim 2 wherein the predetermined point is a predetermined fraction of the pitch ratio of each gear.

4. The apparatus of claim 3 wherein the predetermined fraction is in the range 0.01–0.02.

5. The apparatus of claim 3 wherein the predetermined fraction is about 0.0148.

References Cited
UNITED STATES PATENTS

| | | | |
|---|---|---|---|
| 3,209,593 | 10/1965 | Johanson | 73—182 |
| 3,222,932 | 12/1965 | Henneman | 73—386 |

DONALD O. WOODIEL, Primary Examiner